Feb. 7, 1967

D. KRUCOFF 3,303,489

DIGITAL TO LOG-ANALOG CONVERTER

Filed May 17, 1962

4 Sheets-Sheet 1

INVENTOR
DARWIN KRUCOFF

Feb. 7, 1967 D. KRUCOFF 3,303,489

DIGITAL TO LOG-ANALOG CONVERTER

Filed May 17, 1962

4 Sheets-Sheet 2

INVENTOR
DARWIN KRUCOFF

Feb. 7, 1967 D. KRUCOFF 3,303,489

DIGITAL TO LOG-ANALOG CONVERTER

Filed May 17, 1962

4 Sheets-Sheet 3

INVENTOR
DARWIN KRUCOFF

Feb. 7, 1967 D. KRUCOFF 3,303,489

DIGITAL TO LOG-ANALOG CONVERTER

Filed May 17, 1962 4 Sheets-Sheet 4

INVENTOR
DARWIN KRUCOFF
BY 3,303,489

DIGITAL TO LOG-ANALOG CONVERTER

Darwin Krucoff, Orange County, Calif.
(801 Alvarez Ave., Pinole, Calif. 94564)

Filed May 17, 1962, Ser. No. 196,047
8 Claims. (Cl. 340—347)

This invention relates to digital to analog converters and, more particularly, to an improved digital to log-analog converter wherein the non-linear conversion function is substantially reduced to increase accuracy, reliability, and range.

In the conventional practice of the prior art, digital and analog techniques have been used separately for the purpose of providing logarithmic output signals. According to the usual digital approach, the logarithm is approximated by an iterative series approach which requires a computer for its solution. This means that the logarithmic plotting of computer output signals according to this approach requires a considerable amount of additional computer time to prepare the plotter control signals. In the case of the present-day large scale computers, the computing time may cost many times what the potting time, on a lease basis, would cost.

The other conventional approach is purely analog and specifies a rather complex conversion network which is limited in accuracy and range and is relatively expensive.

Accordingly, it is a principal object of the present invention to provide an improved conversion technique which combines both digital and analog conversion techniques for an optimum combination.

It is another object of the invention to provide for the digital reduction of the conversion problem so that a very small analog conversion range is specified for the completion of the non-linear portion of the conversion.

Still another object of the invention is to provide a device capable of the efficient and accurate conversion of digital input numbers in varying radix position or exponent value into equivalent analog output signals in logarithmic form.

Yet a further object of the invention is to provide a log plotting device utilizing a minimum of analog function generating circuits.

Still a further object of the invention is to provide a variable decimal point or floating decimal input and log-analog in 10-characteristic output conversion device.

Another object is to provide an improved conversion technique whereby a double radix translation is accomplished in an effective manner to permit the reduction or elimination of non-linear function generating.

The novel features which are believed to be characteristic of the invention, both as to its organization and method of operation, together with further objects and advantages thereof will be better understood from the following description considered in connection with the accompanying drawings, in which the various features of the invention are illustrated. It is to be expressly understood, however, that the drawings are for the purpose of illustration and description only, and are not intended as a definition of the limits of the invention.

Figure 1:
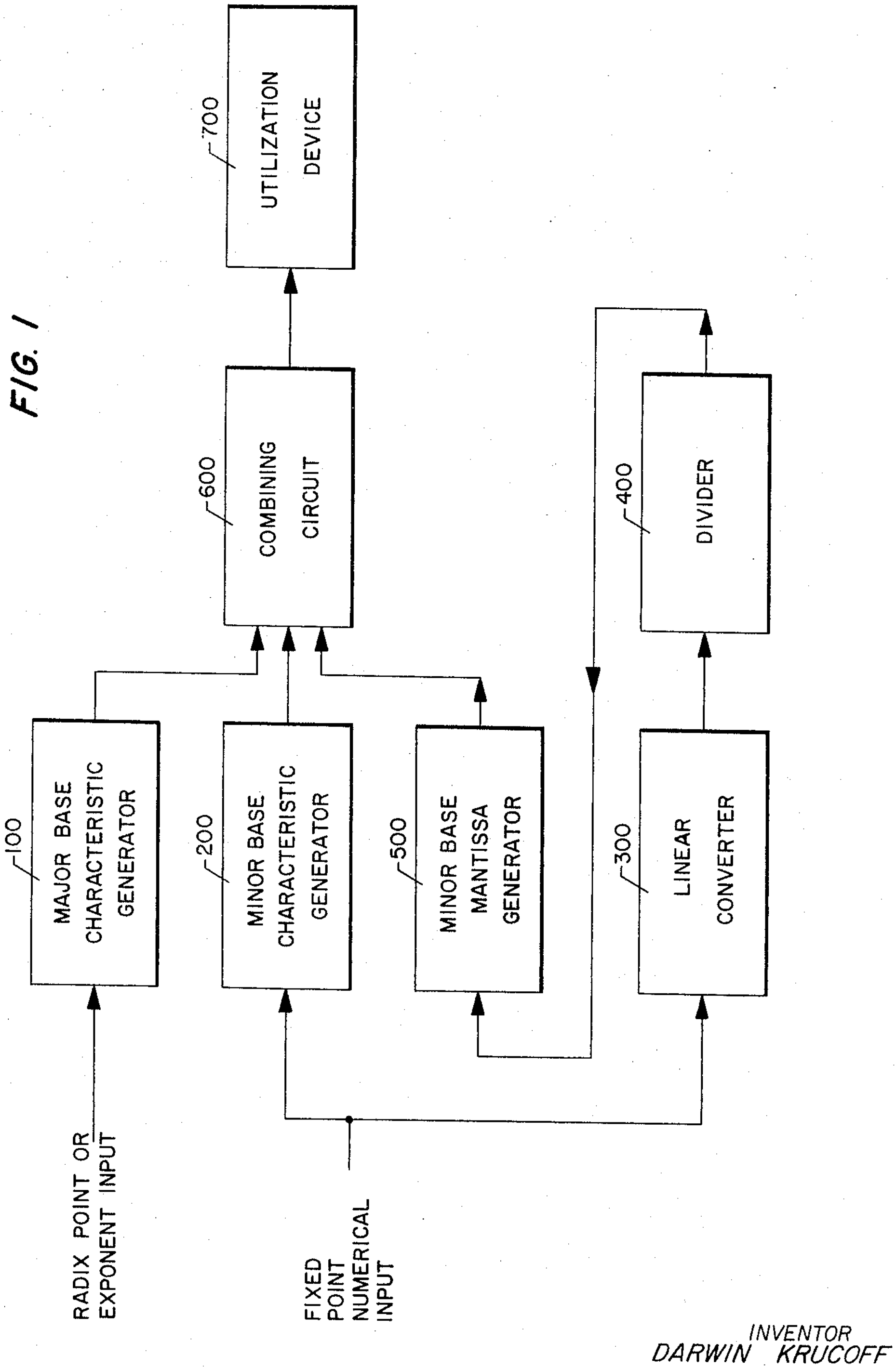
Figure 2:
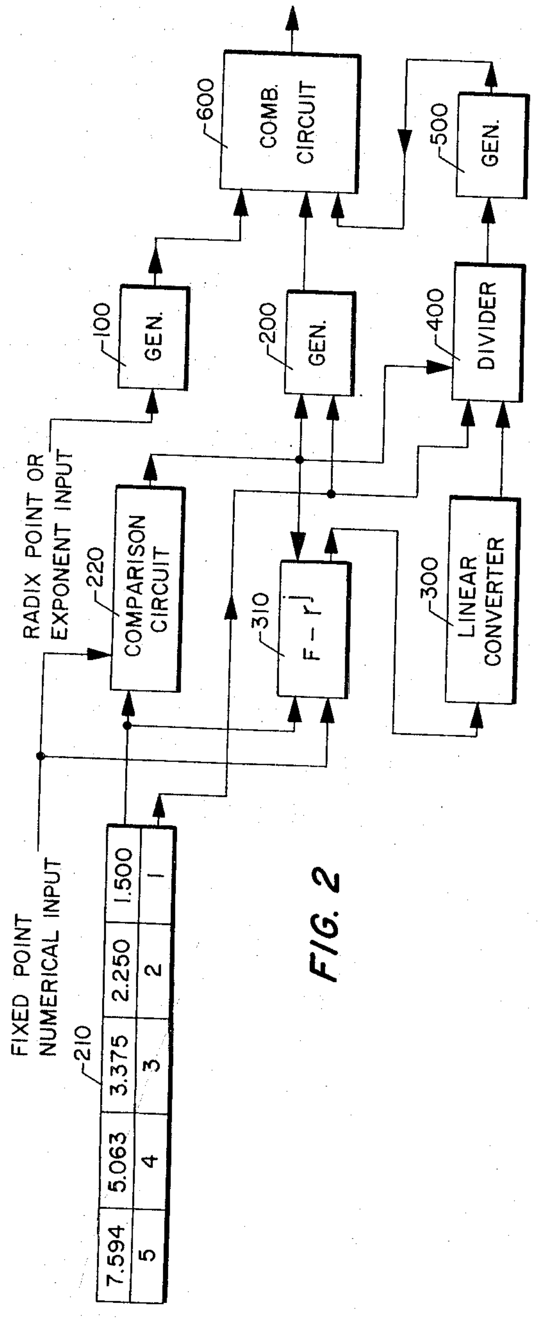
Figure 2A:
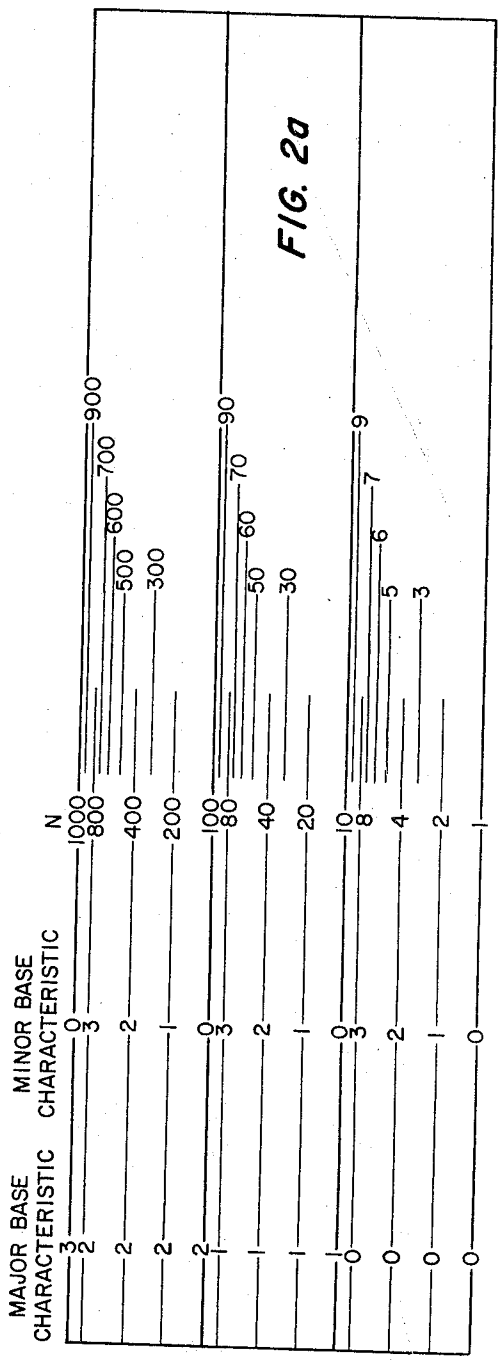

FIGS. 1 and 2 are block diagrams showing two systems which incorporate the present invention;

FIG. 2*a* is a chart which illustrates the double radix conversion technique of the invention; and FIS. 3*a* and 3*b* together provide a schematic diagram of a specific mechanization of the embodiment of FIG. 1.

Reference is now made to the general showing of the invention in FIG. 1. Input signals representing a radix point position or an exponent are applied to a Major Base Characteristic Generator 100. In a typical case these signals may be a decimal digit representing a power of ten or may be binary digits coded to represent an exponent in binary, octal or binary-coded decimal. The function of generator 100, as will be more particularly considered with reference to FIG. 3, is to translate the radix point or exponent signals into an equivalent linear analog output signal which can control the major base characteristic position or a plot or other output function as will be more fully discussed below. It should be noted here that the term analog as used here may include discrete digital steps, where it is only the step itself which is analog whereas the function represented is digital.

The number digits of the input number are applied to two generators: Minor Base Characteristic Generator 200 and Linear Converter 300. The use of minor base generator 200 in combination with major base generator 100 which makes it possible for the present invention to accomplish a considerable improvement over conventional conversion techniques. Before proceeding with further structural description of the invention it will be helpful to consider the manner in which digital input signals are initially translated into the double base characteristic analog output signal.

Suppose that the decimal number 8932 is to be translated into a log-analog output signal according to the invention. The first translation is accomplished through generator 100 to derive the major base characteristic of the input number with the fixed point portion of the number being in a predesignated format. It will be assumed in the following example that this format is such that the point is just to the right of the most significant input digit. Thus the fixed point portion of the decimal number 8932 is represented as 8.932. The total number is then represented as $8932=8.932\times10^3$. Major base generator 100 is thus effective in this case to produce an output signal which is $\log_{10}10^3=3$.

The second translation, according to the invention, is to reduce the number 8.932 through the operation of generator 200, linear converter 300 and divider 400 to a small number times a power of a minor base. As a first illustration it will be assumed that this small base is 2, although other bases will be considered below with reference to FIGURE 2.

The number 8.932 can also be represented as $$8.932/8\times2^3$$

Minor base characteristic generator 200 is thus operative in this case to generate the $\mathrm{Log}_{10}2^3$ which is equal to 3 $\mathrm{Log}_{10}2$. Thus the steps in generator 200 are linear since the logarithm of any power is equal to the power times the logarithm.

Figure 3A:
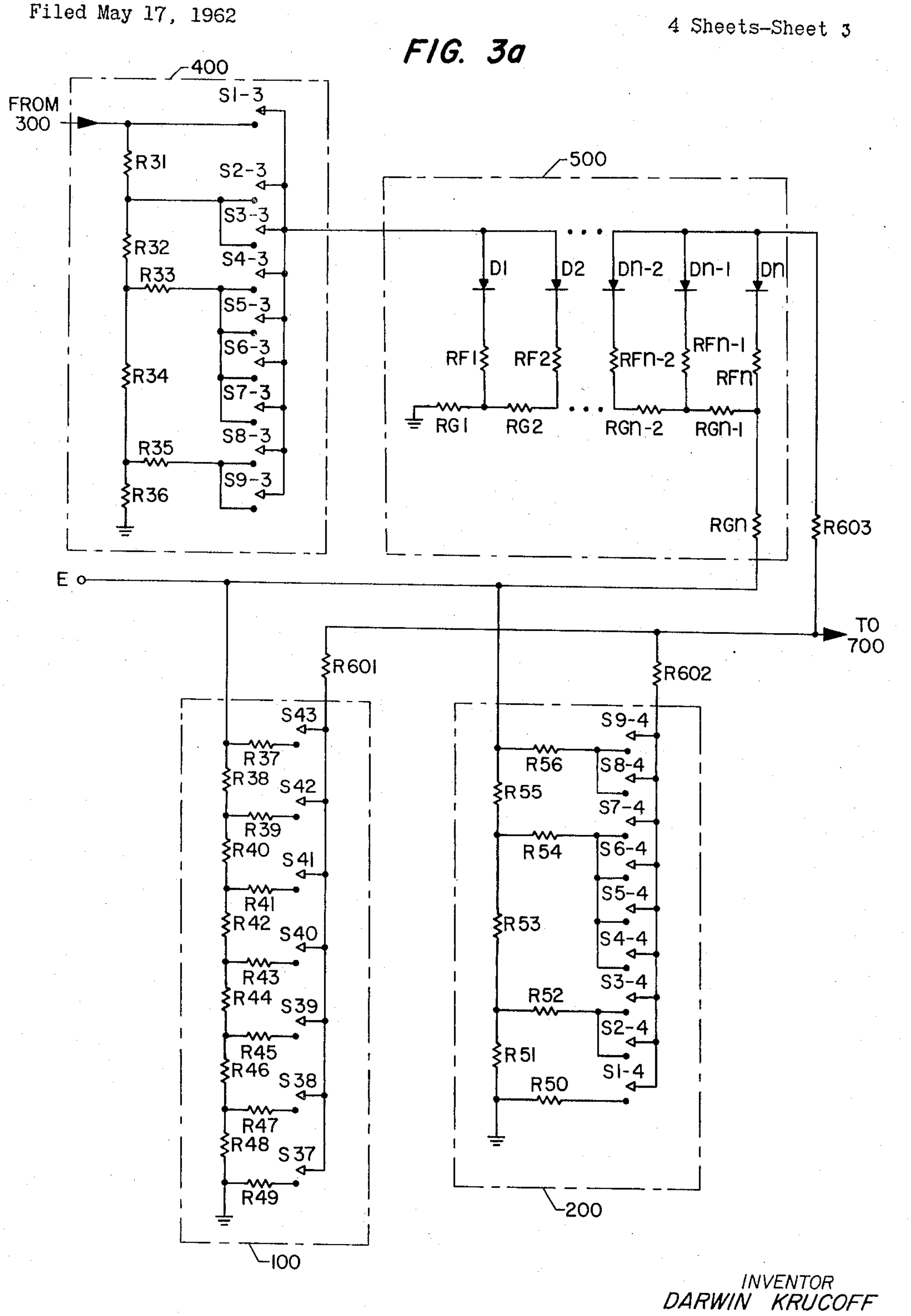

The division by 8 in this example is accomplished specifically by the circuit shown in FIG. 3*a*, i.e.: Divider 400, and provides the converted number:

$$(1+.932/8)\times2^3\times10^3=8932$$

The final step is to form the minor base mantissa to the base 10 (in this example) through the operation of generator 500. Since the $\mathrm{Log}_{10}\,1=0$ it is necessary to subtract the "1" from the output signal of divider 400. This permits utilization of a conventional non-linear function generator which produces zero volts output for zero volts input. It will be understood, of course, that in principle the invention also contemplates the usage of an unconventional non-linear function generator which could include the subtract-one function as part of its operation. In this case the subtract one operation which will now be discussed would be obviated but the non-linear translation would be more difficult.

Figure 3B:
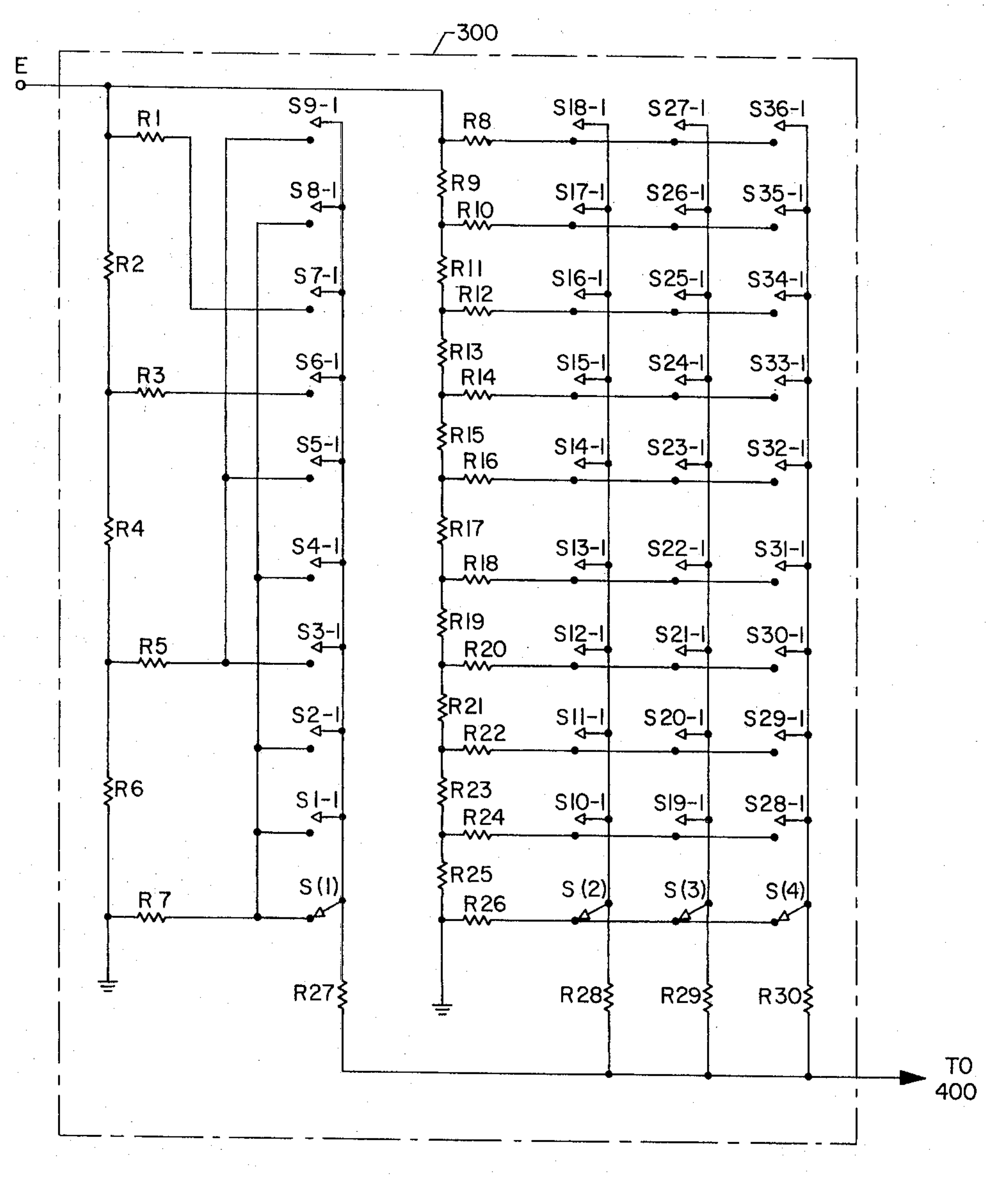

The subtraction of 1 is accomplished in the preferred embodiment of FIGS. 3*a* and 3*b* by reducing the most significant digit of the input number by the minor base to its characteristic. Thus 8 is reduced to 0, 7 to $7-2^2=3$, 6 to $6-2^2=2$, 5 to $5-2^2=1$, 4 to 0, 2 to 0, 3 to 1 and 1 to 0.

Although in theory this reduction may be accomplished by a single analog subtraction or as part of the non-linear function generator mentioned above, it is preferred to accomplish a direct digital subtraction in order to avoid special power supplies and gain the inherent better accuracy of digital operation.

The output signals from generators 100, 200 and 500 are combined to represent the total log-analog output in circuit 600 which may comprise a simple resistor adder as shown in FIG. 3*a* in the form of resistors R601, R602 and R603. The combined signal is then applied to suitable utilization device such as a recording device or the like.

From the description thus far it should be apparent that the invention provides an effective technique for reducing the errors in digital to log-analog conversion. The separation of the major base characteristic from the fixed point number is by itself an important step forward in the conversion art. This improvement is carried forward by the second reduction through the use of the minor base conversion so that the total conversion using two bases can be extremely accurate.

The general technique for double base conversion may be expressed mathematically by the following equations.

(1) Any number N may be expressed as a sum of a series of coefficients times respective powers of a major radix as follows:

$$N=an.R^n+an-1.R^{n-1}\ldots a1.R^1+a(-1).R^{-1}\ldots a(-m).R^{-m}$$

(2) The series of Equation 1 above may be converted into a fixed point number F times a power of R as follows:

$$N=F.R^n$$

$$F=an+an-1.R^{-1}\ldots a1.R^{1-n}+a(-1).R^{-1-n}$$

(3) The fixed point number F may then be further reduced by the same conversion technique into the form: $F=f.r^j$ where $r^j$ is the largest number which can be divided into "*an*" so that $r^j \leq an$.

(4) The number N may then be expressed as follows:

$$N=F/r^j \times R^n \times r^j$$

(5) The log function of N can then be represented as:

$$\text{Log}_R N=\text{Log}_R R^m \times r^j \times F/r^j$$
$$=n+j\text{Log}_R r+\text{Log}_R F/r^j$$

It will be understood from the above that the general formulas developed in (1) through (5) above apply to any radix R or reduction radix *r* and is not limited to 10 and 2 as in the specific embodiment illustrated in FIGS. 3*a* and 3*b*.

Reference is now made to FIG. 2 where another illustration of the system concept of the invention is presented. In this case it is assumed that the major base is either 8 or 10 and that the minor base is 1.5. Characteristic generator 200 includes a memory device (which could be a serial delay line or memory drum or disc) identified as 210, which contains all of the $r^j$ factors up to the maximum value of "*an*." In the case of both decimal and octal the highest power is $1.5^5=7.59375$.

A comparison circuit 220 is included in generator 200 for detecting the maximum $r^j$ which can be subtracted and for applying the corresponding minor base characteristic (1 through 5) to subtraction device 310 which forms the difference $F-r^j$ (to avoid the use of a non-conventional function generator) and the characteristic "*j*" is applied to divider 400 to control the division of $$(F-r^j)/r^j=F/r^j-1$$

The other functions of the arrangement of FIG. 2 are the same as in FIG. 1 and will not be described. Reference is now made to FIG. 2*a* where a chart is shown illustrating the operation of the invention with a major base of ten and a minor base of two. The numbers N are shown for 1 through 1000 with sub-divisions for ten cases for each major characteristic. Thus the numbers 1 through 9 are shown for major characteristic 0, 10 through 90 for characteristic 1, 100 through 900 for characteristic 2, and 1000 for characteristic 3. The minor base characteristic is 0, 1, 2, or 3.

Reference is now made to FIGS. 3*a* and 3*b*. In FIG. 3*a* one form of generator 100 is shown where $R=10$ and the major characteristic may be any of 0, 1, 2, 3, 4, 5, or 6. In this arrangement it is assumed that switches S37 through S43 are closed for 0 through 6, respectively. These switches are associated with decimal power weighting resistors (values corresponding to the decimal characteristic) such that each switch provides a signal corresponding to the decimal characteristic desired. Thus S37 is connected through a balancing resistor R49 to ground to represent the 0 characteristic. S38 connects through R47 to R48 to represent 1, S39 connects through R45 to R46 to represent 2 and so forth. The resistor values for R36 through R49 are selected to provide the desired linear progression.

The major base characteristic signal of generator 100 is connected to resistor 601 which junctions with R602 at the minor base generator 200 output. Generator 200 includes switch contacts S1–4 through S9–4. The "–4" reference is used since three other contacts are provided for switching functions which are discussed below. The symbols S1 through S9 represent the "*an*" digit of F or the most significant decimal digit in this example. Generator 200 acts as a comparator in operation by switching an output signal to resistor R602 which represents the highest characteristic "*j*" which is possible for the particular F value (actually only looking at "*an*" of F). It will be noted, therefore, that S1–4 connects through balancing resistor R50 to ground since "$j$"=0. Switches S2–4 and S3–4 connected through R52 to R51 to provide a $\text{Log}_{10}2$ signal. Switches S4–4, S5–4, S6–4, and S7–4 all connect to R54 and thence to R53 to provide a $2.\text{Log}_{10}2$ signal. And, switches S8–4 and S9–4 connect through R56 to R55 to develop a $3.\text{Log}_{10}2$ signal.

A specific mechanization of Linear Converter 300 is shown in FIG. 3*b*. Switches S1–1 through S9–1 are connected to resistors R1 through R7 to accomplish the function "$an-r^j$." Thus S1–1, S2–1, S4–1 and S8–1 are all connected through R7 to zero volts to represent a difference of zero. This corresponds to the 0, 1, 2 and 3 reference lines in FIG. 2*a* where the non-linear function is zero after the reduction by the minor base.

Switches S3–1, S5–1 and S9–1 are each connected through R5 to R6 to represent a linear value of 1, since in each case the difference "$an$"$-2^j$ is 1. For 3 this subtraction is $3-2^1$, for 5 the subtraction is $5-2^2$ and for 9 the subtraction is $9-2^3$.

Switch S6–1 is uniquely connected via R3 to R4 for the case of $6-2^2=2$. And switch S7–1 is uniquely connected via R1 to R2 for the case of $7-2^2=3$. Switch S(1) represents the series connection of contacts S1–2 through S9–2 (not shown) which are normally closed contacts. If no switch is actuated in the most significant position the system forces a zero output signal. The recording or output signal is in error in this case since the fixed point portion F was not entered in the desired format. Another possible signal in this case would be to force the output signal off scale to indicate the error.

The remaining switches shown in FIG. 3*b* are used for the lower decimal places in the example. Switches S10–1 through S18–1 are for the decimal digit just to the right of the point, i.e.: $10^{-1}$. Switches S19–1 through S27–1 are for the $10^{-2}$ place of F; and switches S28–1 through S36–1 are for the $10^{-3}$ place of F. Switches S(2), S(3) and S(4) are for providing a zero output for the respective place if no switch is actuated and operate in the same manner as S(1) mentioned above.

Resistors R9, R11, R13, R15, R17, R19, R21, R23 and R25 are designed to provide the nine linear divisions for the nine decimal non-zero digits. These signals are obtained through respective balancing resistors R8, R10, R12, R14, R16, R18, R20, R22 and R24, with zero being obtained through R26.

The output signal from each decimal place representation is applied to one of R27, R28, R29 and R30. These output resistors are designed to give each decimal place its proper representation. Thus a 1 in the most significant place produces a signal ten times the weight of the $10^{-1}$ place "1"; 100 times the weight of the $10^{-2}$ place "1" and 1000 times the weight of the $10^{-3}$ place "1". That is the relative adding weight of resistors R27 through R30 is 1; $1/10$; $1/100$; and $1/1000$.

The output signal of circuit 300 is applied to divider 400 shown in FIG. 3*a*. In this circuit contacts S1–3 through S9–3 are connected to the resistors shown to accomplish the desired division by $r^j$. Dividing resistors R31, R32, R34 and R36 have relative values of: 4; 2; 1; and 1. If switch S1–3 is closed corresponding to a division by $r^0=1$, the signal from converter 300 is taken directly across the series connection of 4+2+1+1. Thus no division is performed or a division by one may be considered to have been accomplished. If either S2–3 or S3–3 is closed a division by $2^1=2$ is accomplished by reading from the junction or R31 and R32. This provides the voltage division of 2+1+¼+2+1+1 or by 2.

In a similar manner switches S4–3 through S7–3 divide by 4 or $2^2$ and are connected through balancing resistor R33 to the R32 to R34 junction for this purpose; and switches S8–3 and S8–3 connected through R35 to the R34 to R36 junction to divide by 8.

The output signal of circuit 400 is applied to non-linear function generator 500 which is assumed to be a conventional diode circuit. This circuit, as is well known, provides a linear tangential segment approximation to the desired function. In this specific case the diodes D1 through D*n* each switch on at the desired function point to connect the proper resistive function. Diode D1 connects in RG1 through RF1; diode D2 connects in RG2 through RF2 and so forth. It will be noted that the conventional technique is used where no signal applied results in zero volts out. The output of circuit 500 connects to combining resistor R603 which is junctioned with R601 and R602 to form circuit 600. This then is applied to circuit 700 for the desired utilization function.

From the foregoing description it should now be apparent that the present invention provides an important step forward in the art of converting digital input signals into some type of graphical output signal which may be recorded or displayed. In its generic sense the invention contemplates any means of translating a digital input into a fixed point portion and a radix power for linear logarithmic translation.

In a more limited sense the invention provides a double radix conversion which permits the limiting of the non-linear range of the conversion. It will be understood, of course, that in the ultimate the invention permits reduction of the non-linear range to the point where it need not be converted at all.

It will be understood that the specific references to decimal and binary as convenient radices is not intended as a limitation upon the invention and that the specific circuits shown are for the purpose of illustration only and do not imply any limitations upon the generic technique of the invention. The scope of the invention is limited only by the appended claims.

I claim:

1. A digital to log-analog converter comprising: first means for translating a digital input number into a fixed point portion and a power of a radix; second means responsive to a set of signals representing said power for producing a major base characteristic signal corresponding to the characteristic of a logarithm to said radix; third means for translating said fixed point portion to a logarithmic mantissa based also on said radix; and fourth means for combining said major base characteristic and said logarithmic mantissa to produce a log-analog of said digital input number.

2. In combination: a major base characteristic generator for receiving a radix point designating input signal and for producing a major base characteristic based upon said radix; second means responsive to a numerical input signal set representing the fixed point portion of an input number for producing a minor base characteristic signal to reduce the fixed point portion of said numerical input signal; third means for converting said numerical input signal to a linear representation in analog representation; fourth means for dividing said linear representation by the minor base radix to its characteristic; and fourth means for translating the output of said divider to a minor base mantissa signal.

3. A converter comprising: an input circuit for receiving a set of number signals representing a number N defined as $N=F.R^n$ where F is a fixed point portion and R is a major radix taken to the *n* power; a major base characteristic generator for producing a linear log signal corresponding to the characteristic *n*; a linear converter for producing a linear log signal corresponding to the fixed point portion F; a non-linear mantissa generator for translating said linear log signal for F into a corresponding log-analog signal to the base R; and means for combining the output signals of the foregoing means to produce a log-analog output signal.

4. A converter comprising: an input circuit for receiving a set of number signals representing a number N defined as $N=F.R^n$ where F is a fixed point portion and R is a major radix taken to the *n*th power; first means for producing a linear signal representing *n*; second means for translating the most significant coefficient *an* of said fixed point portion F into a coefficient $an-r^j$ where $r^j$ is the maximum number which can be devided into *an* without causing a result less than 1; third means for generating a minor base characteristic signal representing $j\text{Log}_R r$; fourth means for combining a signal representing $an-r^j$ and a set of signals representing the other coefficients of F into a linear signal representing the summation thereof with appropriate weighting for the power of said radix R; means for dividing the output of said fourth means to produce a divided signal; fifth means for translating said divided signal into a base *r* mantissa; and means for combining the signal representing *n*, the signal representing $j\text{Log}_R r$; and said base *r* mantissa to form a complete log-analog output signal corresponding to the number $N=F/r^j \times R^n \times r^j$.

5. A digital to log-analog converter for translating floating point decimal numbers in the form $N=F.10^n$ into a corresponding logarithmic output signal, F representing the fixed point portion of said decimal number and *n* representing the number of decimal places to the right of the first integer in said number; said converter comprising: a first network for translating digit signals representing *n* into a $\log_{10}$ characteristic signal; a second network for producing a linear representing of said fixed point portion F, said network including a column of translation elements for each place of said number; a non-linear function generator circuit for producing a logarithmic approximation of said portion F to the base 10; and output means for producing a signal equal to the summation of said *n* signal, and said logarithmic approximation of portion F.

6. A converter for translating a floating point decimal number into the form $N=F/2^j \times 10^n \times 2^j$ into a corresponding logarithmic output signal, where F represents the fixed point portion of said decimal number, *n* represents the floating point exponent, and *j* represents a minor base exponent, where the base is 2 in this case; said converter comprising: a first translation circuit for producing a signal corresponding to *n* as a linear analog function of the exponent; a second translation circuit for producing a signal corresponding to $\log_{10}2\times j$, as a linear summation of signals corresponding to different multiples of $\log_{10}2$; a linear converter circuit for translating F into a corresponding analog signal; a divider circuit for performing the linear subdivision of the analog output signal of said linear converter to form a signal representing $F/2^j$; a non-linear function generating circuit for translating said signal $F/2^j$; and a linear addition circuit for performing the summation $\text{Log}_{10}F/2^j+n+j\text{Log}_{10}2$.

7. A digital to log-analog converter system comprising: first means for translating the power $n$ of a floating point number $N=F.R^n$ into a corresponding log-characteristic signal; second means for comparing the most significant coefficient for F, $an$ to various powers of a minor base radix $r$ to determine the maximum $r^j$ that can be divided into F without resulting in a number less than one; means for performing the coefficient modificient $an-r^j$; means for combining $an-r^j$ with the remaining coefficients of F and producing a weighted output signal providing a linear representation of this summation; means for dividing said linear summation by the factor $r^j$; and means for forming a small base mantissa function upon the output of said dividing means so that the log of N is expressable as: $\text{Log}_R F/r^j+n+j\text{Log}_R r$.

8. A converter comprising: first means for translating the power $n$ of a floating point number $N=F.10^n$ into a corresponding log-characteristic signal; second means for comparing the most significant coefficient of F, $an$ to various powers of a minor base of 1.5 to determine the maximum $1.5^j$ that can be divided into F without resulting in a number less than one; means for substracting $1.5^j$ from $an$; means for combining $an-1.5^j$ with the remaining coefficients of F and producing a weighted output signal; and means for forming a small base mantissa function to permit the combination of this function with $n$ and $\text{Log}_{10}1.5\times j$ to form the complete logarithm of N which is expressible as:

$$\text{Log}_{10}N=\text{Log}_{10}F/1.5^j+n+j\text{Log}_{10}1.5$$

No references cited.

MAYNARD R. WILBUR, *Primary Examiner.*

DARYL W. COOK, *Examiner.*

L. W. MASSEY, W. J. KOPACZ, *Assistant Examiners.*